March 1, 1927.

W. C. MURTAUGH

CALIBRATING DEVICE FOR GAUGE STICKS

Filed Jan. 30, 1926

1,619,363

Inventor
William C. Murtaugh
By his Attorney
R. J. Dearborn

Patented Mar. 1, 1927.

1,619,363

UNITED STATES PATENT OFFICE.

WILLIAM C. MURTAUGH, OF CHICAGO, ILLINOIS.

CALIBRATING DEVICE FOR GAUGE STICKS.

Application filed January 30, 1926. Serial No. 84,822.

This invention relates to calibrating devices for gauge sticks.

One of the objects of the invention is to provide a device for calibrating gauge sticks for use in particular tanks and for simplifying the work of calibrating such sticks.

Another object of the invention is to provide a device for calibrating gauge sticks having means for insuring that the gauge stick is held in a vertical position in a tank during the calibration thereof.

Other objects, features and advantages of the invention will become apparent as the description, outlined in connection with the accompanying drawing, proceeds.

In the drawing, Figure 1 is a side elevation of a gauge stick, showing a metal container with a gauge pole and a slidable member in position.

Figure 1:
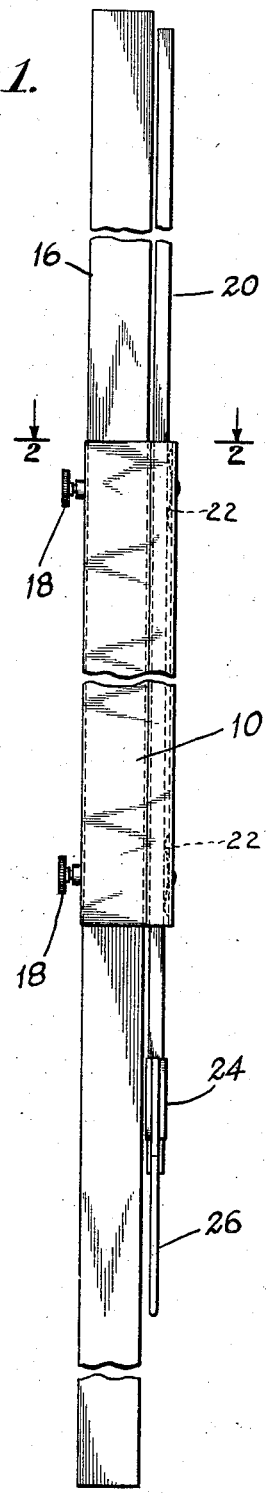
Figure 2:
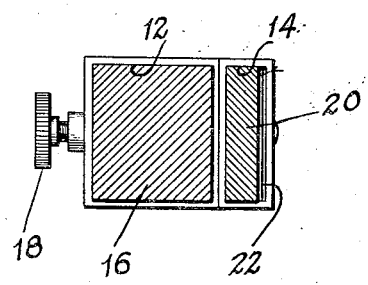
Figure 2 is a sectional plan view taken on the line 2—2 of Figure 1.
Figure 3:
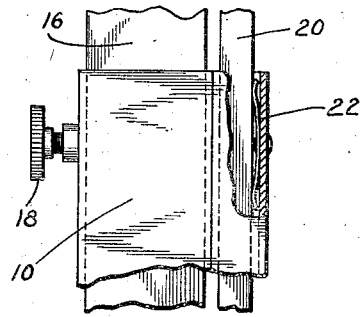
Figure 3 is a view in side elevation of a part of the stick, a portion of the casing having been broken away to show the manner in which the slidable member is held in position.
Figure 4:
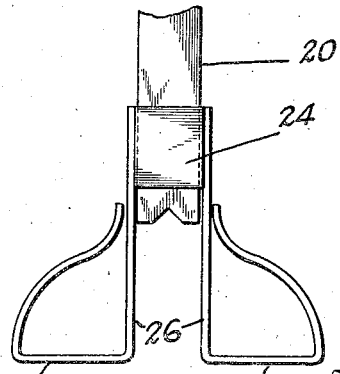
Figure 4 is a view in front elevation of the lower portion of the slidable member.

Referring to the drawing, 10 represents a casing, which may be constructed of a suitable metal, such, for example, as copper, and formed with two passageways 12 and 14, one square and one rectangular in cross section. A square gauge stick 16 is slipped through the square passageway 12 and is rigidly secured in the desired position by means of threaded thumb screws 18, 18, which extend through a side wall of the metal casing through two suitable threaded openings provided for this purpose.

A slidable member or stick 20 is inserted in the rectangular passageway 14. Resilient members in the form of narrow strips of spring metal 22 are positioned inside the rectangular passageway, being secured to the outer wall opposite the thumb screws thereof by rivets or other suitable means for engaging the slidable member 20 and holding it in any desired position.

A metal collar or band 24 is secured around the lower end of the slidable member 20 and to it are soldered or otherwise secured two spaced metal rods 26, both of which are bent to form projections 26', extending at right angles to the slidable member. The two rods are secured on opposite sides of the slidable member and are consequently spaced somewhat apart.

When it is desired to ascertain the capacity of a tank, such for example, as a tank wagon, and to calibrate a gauge stick for subsequently determining the liquid contents of the tank in question, an unmarked gauge stick is inserted in the square passageway of the casing 10 and the thumb screws 18 are tightened up to hold the gauge stick in the desired position. The slidable member is then inserted in the rectangular passageway of the casing 10 and the entire device is inserted into the tank until the end of the gauge stick rests on the bottom of the tank. Liquid is then poured into the tank in known quantities, as for example, five gallons at a time. When five gallons of liquid have been poured into the tank the slidable member is moved up or down as may be required until the metal rods 26 both just touch the surface of the liquid in the tank. The slidable member can be moved freely against the resistance of the springs 22 but when it is desired to withdraw the device from the tank the springs will prevent undue moving of the member 20. Having positioned the slidable member 20 so that the metal rods 26 both just touch the surface of the liquid, which condition is indicated to the operator by a slight ripple and shows that the gauge stick is being held in a vertical position, the device is removed from the tank and a mark is placed on the gauge stick at the liquid level line. This mark can be conveniently applied by means of a keen edged tool such as a hack saw which can be guided against the horizontal portion 26' of the metal rods 26. Having made this mark the device is again inserted in the tank and five additional gallons of liquid are poured therein. The slidable member is moved upwardly until the projections 26' again just touch the surface of the liquid, when the entire device is withdrawn from the tank and a second mark is placed on the gauge stick, indicating the ten gallon level. This procedure is repeated until the tank has been filled, when the gauge stick can be removed from the casing 10 and subsequently used for determining the liquid contents of the tank.

By having a guide for a hack saw or the like it is possible to immediately make the necessary marks on the gauge stick without going through the usual steps of marking the liquid level with chalk or pencil and subsequently cutting the usual notches in the stick. Thus considerable time is saved in the work of calibrating a gauge stick for a particular tank.

A device of preferred form has been illustrated and described for the purpose of showing one way in which this invention may be practiced, but the inventive thought upon which this application is based is broader than this illustrative embodiment thereof and, therefore, no limitations are intended other than those imposed by the appended claims.

I claim:

1. A calibrating device for gauge sticks comprising a casing formed with two passageways extending therethrough and through one of which a gauge stick may extend, means adapted to engage the gauge stick to secure it in a desired position, a slidable member extending through the second of said passageways, resilient means on the inner wall on the second passageway adapted to engage the slidable member to prevent undesired movement thereof, and means on the lower end of said slidable member for indicating the liquid level in a tank or container and serving as guides for a tool for marking the corresponding level on the gauge stick.

2. A calibrating device for gauge sticks comprising a casing formed with two passageways extending therethrough, and through one of which a gauge stick may extend, thumb screws extending through a wall of the casing and adapted to maintain the gauge stick in a desired position, a slidable member extending through the second of said passageways, means for preventing undesired movement of the slidable member, a collar secured on the lower end of the slidable member, and oppositely disposed projections on the collar for creating a ripple on the surface of the liquid into which the device is inserted for indicating the height of the liquid and for indicating when the gauge pole is in vertical position.

3. A calibrating device for gauge sticks comprising a casing having passageways extending therethrough and through one of which a gauge stick may extend with one end thereof adapted to rest on the bottom of a tank, means for securing the gauge stick in the desired position in the casing, a second stick extending through another of said passageways and adapted to be moved up or down as the liquid in the tank rises or falls, and means on the second stick for indicating when the end thereof just touches the surface of the liquid in the tank and for guiding a keen edged tool when marking a corresponding level on the gauge stick.

In witness whereof I have hereunto set my hand this 12th day of December, 1925.

WILLIAM C. MURTAUGH.